United States Patent
Ho et al.

(10) Patent No.: US 7,310,090 B2
(45) Date of Patent: *Dec. 18, 2007

(54) OPTICAL GENERIC SWITCH PANEL

(75) Inventors: Chi Mun Ho, Jalan Merbok Dua (MY); Chin Hin Oon, Lorong Midlands (MY); Kean Loo Kah, Jalan Batu Uban (MY)

(73) Assignee: Avago Technologies ECBM IP (Singapore) Pte Ltd., Singapore (SG)

( * ) Notice: Subject to any disclaimer, the term of this patent is extended or adjusted under 35 U.S.C. 154(b) by 667 days.

This patent is subject to a terminal disclaimer.

(21) Appl. No.: 10/810,157

(22) Filed: Mar. 25, 2004

(65) Prior Publication Data

US 2005/0212774 A1    Sep. 29, 2005

(51) Int. Cl.
*G06F 3/042* (2006.01)
(52) U.S. Cl. .................. 345/175; 178/18.09
(58) Field of Classification Search .......... 345/173, 345/175, 176; 178/18.03, 18.09, 18.11; 250/221
See application file for complete search history.

(56) References Cited

U.S. PATENT DOCUMENTS

| | | | | |
|---|---|---|---|---|
| 4,305,071 A | * | 12/1981 | Bell et al. | 345/176 |
| 4,542,375 A | * | 9/1985 | Alles et al. | 345/176 |
| 4,561,017 A | * | 12/1985 | Greene | 348/707 |
| 6,061,177 A | * | 5/2000 | Fujimoto | 359/443 |
| 6,310,615 B1 | * | 10/2001 | Davis et al. | 345/173 |
| 7,176,905 B2 | * | 2/2007 | Baharav et al. | 345/175 |
| 2003/0081428 A1 | * | 5/2003 | Neta | 362/558 |
| 2004/0252091 A1 | * | 12/2004 | Ma et al. | 345/87 |
| 2005/0200294 A1 | * | 9/2005 | Naugler et al. | 315/149 |
| 2007/0046640 A1 | * | 3/2007 | Oon et al. | 345/173 |

\* cited by examiner

*Primary Examiner*—Ricardo Osorio

(57) ABSTRACT

A switch panel having a touch plate, image generator, and imaging system. The touch plate includes an optically transparent layer having first and second sides. The optically transparent layer having an index of refraction greater than that of air. A light source generates a light signal that is reflected between the first and second sides of the touch plate within the transparent layer. The imaging system records an image of the first surface. An image generator displays an image that includes a plurality of button positions to a person viewing the touch plate from the first side. A portion of the light signal is reflected toward the second surface at an angle greater than the critical angle in the optically transparent layer when the first surface is touched. The imaging system determines the location of the touch from the location of the reflected light.

11 Claims, 3 Drawing Sheets

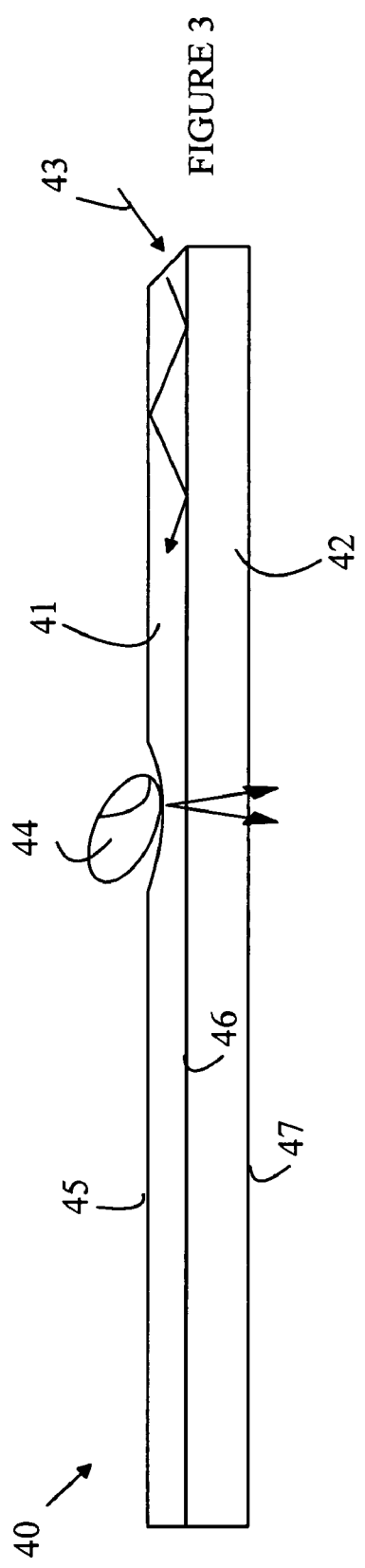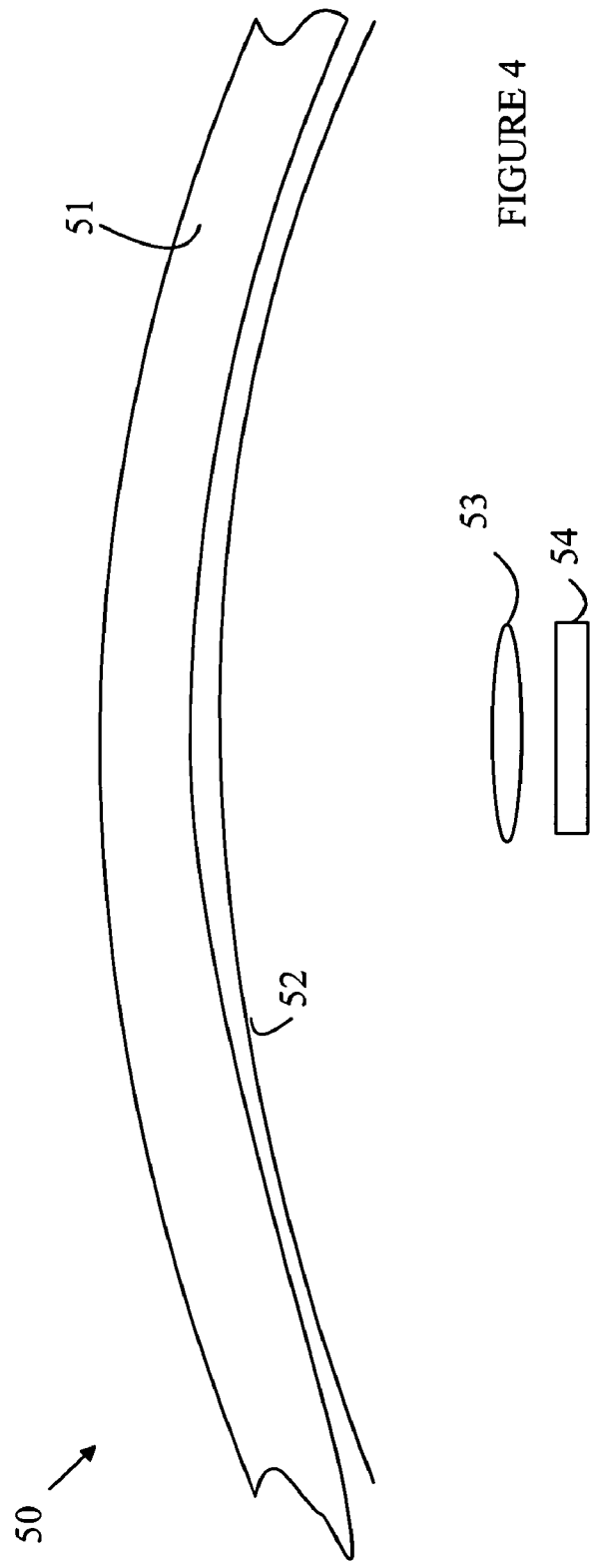

OPTICAL GENERIC SWITCH PANEL

FIELD OF THE INVENTION

The present invention relates to switch panels.

BACKGROUND OF THE INVENTION

Control systems for various apparatuses rely on a plurality of switches to input data to the apparatus. Switch arrays based on mechanical switches mounted on a surface are well known in this regard. Simulated switch arrays that utilize touch screens are also well known. Mechanical switch panels are difficult to reconfigure, and hence, tend to be customized for each application. This substantially increases the cost and product cycle time of devices that utilize such panels.

Input devices based on touch screens provide a convenient method for inputting commands in a manner that is easily reconfigurable. In such devices, the button pattern is displayed on the screen and the user selects a "button" by touching the screen over the button image. Touch screens, however, are significantly more expensive than conventional switches, and hence, are not always feasible for many applications. In addition, the ambient light intensity can interfere with the display that prevents the user from seeing the simulated buttons. Furthermore, the device cannot distinguish between an accidental light touch and an intended button push, since the screens do not provide a measure of the pressure with which the user has pressed his or her finger on the screen.

Many touch screen designs depend on detecting a change in some electrical parameter such as resistivity or capacitance that varies with the location on the screen at which the user touches the screen. Since the observed changes depend on the shape of the screen, custom screen sizes are limited and can require special programming.

SUMMARY OF THE INVENTION

The present invention includes a switch panel having a touch plate, image generator, and imaging system. The touch plate includes an optically transparent layer having first and second sides. The optically transparent layer having an index of refraction greater than that of air. A light source generates a light signal that is reflected between the first and second sides of the touch plate within the transparent layer. The imaging system records an image of the first surface of the touch plate. An image generator displays an image that includes a plurality of button positions to a person viewing the touch plate from the first side. The imaging system determines the location at which the person touches the first side of the plate and generates a signal if the plate is touched at the location of one of the button positions. A portion of the light signal is reflected toward the second surface at an angle greater than the critical angle in the optically transparent layer when the first surface is touched with a force greater than a predetermined force. In one embodiment, the first surface deforms sufficiently when a predetermined pressure is applied thereto to cause a portion of the light signal to be reflected toward the second surface at an angle greater than the critical angle in the optically transparent layer. In one embodiment, the optically transparent layer is a plastic and/or glass. In another embodiment, the optically transparent layer includes a pressure deformable layer of optically transparent material bonded to a layer of non-deformable material. In one embodiment, the light signal includes light of a probe wavelength and the image generator generates an image that is devoid of light of the probe wavelength. In this embodiment, the imaging system selectively images light of the probe wavelength while blocking light of other wavelengths. In another embodiment, the imaging system generates a difference image that includes a difference of first and second images. The first image is formed when the light signal is absent from the optically transparent layer and the second image is generated when the light signal is present in the optically transparent layer.

BRIEF DESCRIPTION OF THE DRAWINGS

FIG. 3 is a cross-sectional view of a touch plate 40 that utilizes a flexible layer of a transparent medium.

FIG. 4 is a cross-sectional view of a portion of a switch panel 50 in which the touch plate is curved.

DETAILED DESCRIPTION OF THE PREFERRED EMBODIMENTS OF THE INVENTION

Figure 1:
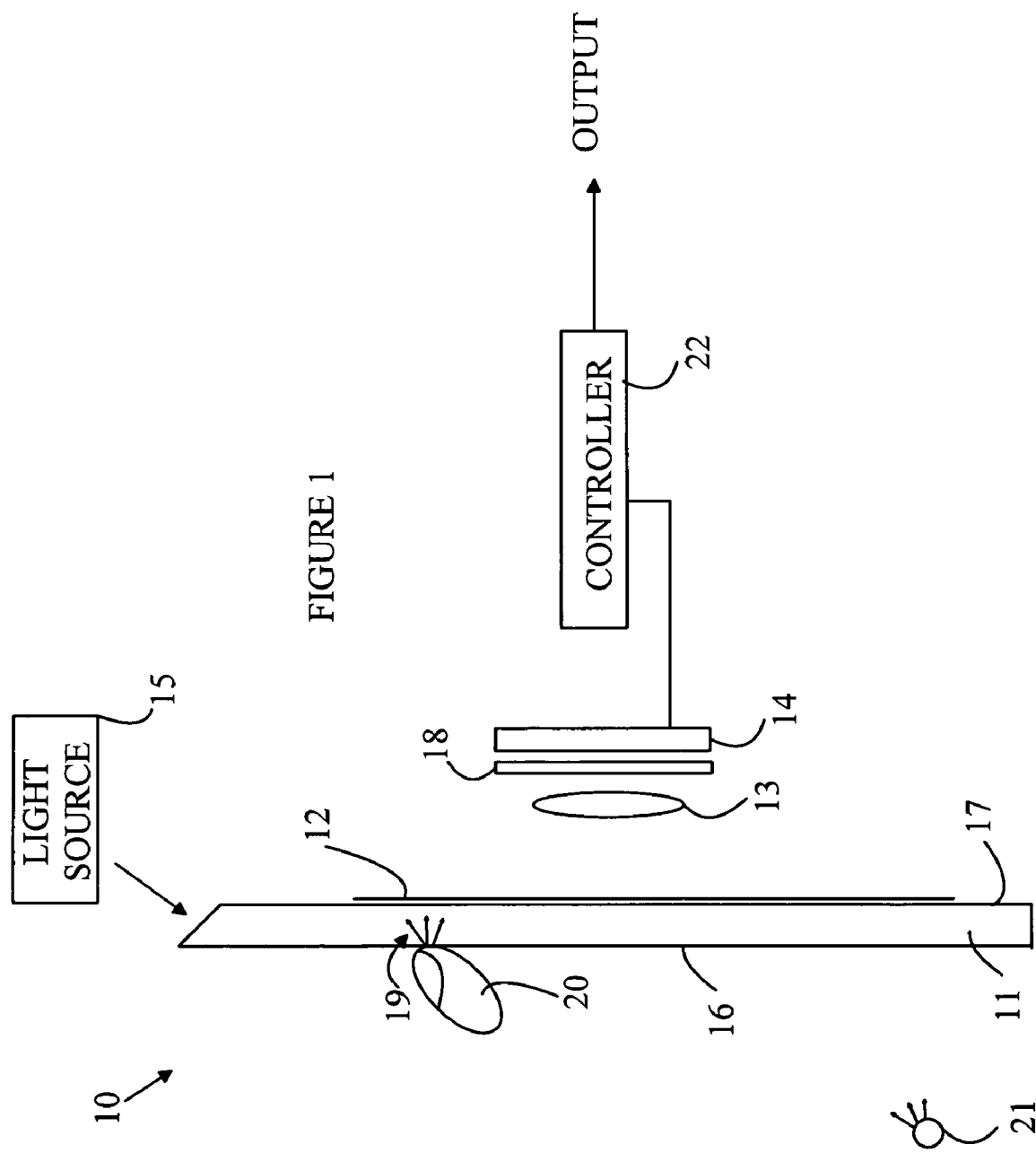
FIG. 1 is a cross-sectional view of a switch panel 10 according to one embodiment of the present invention.

The manner in which the present invention provides its advantages can be more easily understood with reference to FIG. 1, which is a cross-sectional view of a switch panel 10 according to one embodiment of the present invention. Switch panel 10 utilizes a transparent screen 11 that emits light when a user presses the user's finger 20 against the screen. As will be explained in more detail below, the light is generated at the point of contact.

Surface 16 is imaged onto a photodetector array 14 by lens 13. Photodetector array 14 can be constructed from a CCD camera array of the type used in optical mice, inexpensive cameras, or the like. The output of the photodetector array is processed by a controller 22 that generates an output signal indicative of the "button" pushed by the user.

The output "signal" generated by controller 22 can take a number of forms. For example, controller 22 can generate an electrical signal. In addition, controller 22 can include switches and/or relays that are actuated when controller 22 determines that a particular simulated button has been pushed. Further, controller 22 can include a light generator that is actuated to provide a light signal when a particular simulated button is pushed. The light may be displayed to the person touching the screen or to someone at a remote location. In yet another embodiment, controller 22 includes a sound generator that provides an audible signal when a simulated button is pushed.

A mask 12 behind screen 11 has pictures of "buttons" and various labels thereon. This mask is visible to the user. The mask is transparent to the light generated by screen 11 when the user touches the screen. The mask may be illuminated with a separate light source 21 to aid the user in visualizing the mask. The light source can be positioned either in front of screen 11 or behind screen 11. For the purposes of this discussion, it is sufficient to note that the wavelength of the illumination light is preferably different from that generated by the user touching screen 11. Hence, any stray illumination light can be easily separated at the photodetector array from the light signals generated by the user touching screen 11.

As noted above, screen 11 emits light when touched by the user. In one embodiment, screen 11 is a plate of glass, plastic, or similar transparent medium that is illuminated by a light source 15 from one end. The illumination angle is chosen such that the light will be internally reflected within the plate, and hence, the light is not visible to the user or the imaging system when so trapped. That is, the light strikes the surfaces of the touch screen at an angle that is less than the critical angle. The critical angle is determined by the index of refraction of the material from which the plate is constructed. The present invention preferably utilizes a material having an index of refraction greater than 1.25.

When the user presses on the surface, the user alters the index of refraction of the plate at the location on surface 16 at which the user's finger makes contact. Some of the light at this location escapes from the surface of the plate and is reflected by the user's finger as shown at 19. Some of this light will strike surface 17 at an angle greater than the critical angle, and hence, escape screen 11 and be imaged onto photodetector array 14.

To distinguish the light generated by the user's touch from other sources of stray light, light source 15 preferably generates light of a predetermined wavelength. A filter 18 over photodetector array 14 is utilized to block light of wavelengths other than this wavelength. Hence, the point at which the user touches the screen appears to be a bright light source within the image formed on photodetector array 14.

Figure 2:
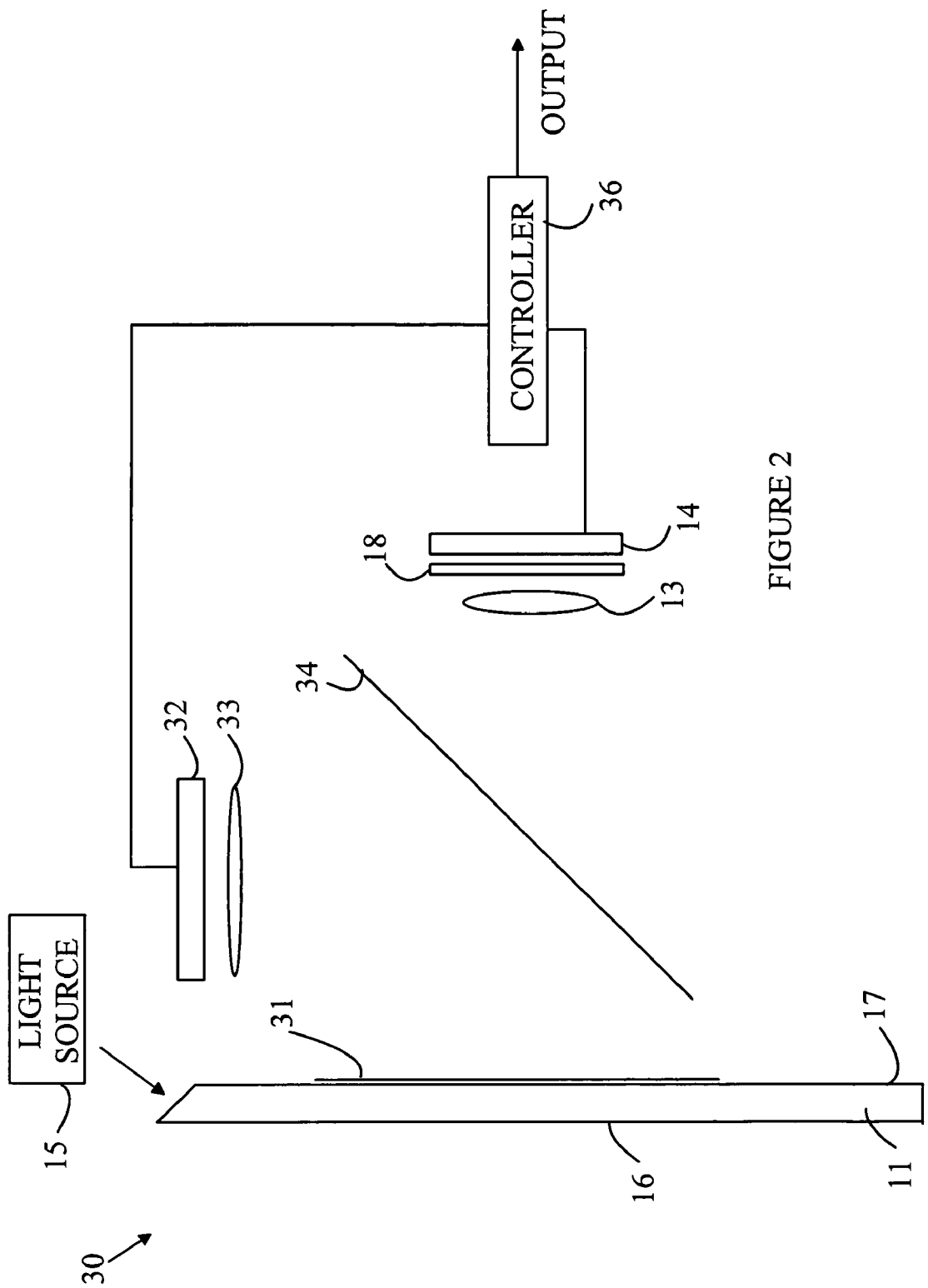
FIG. 2 is a cross-sectional view of a switch panel 30 according to another embodiment of the present invention.

Embodiments of the present invention in which the "button" picture can be changed can also be constructed. Refer now to FIG. 2, which is a cross-sectional view of a switch panel 30 according to another embodiment of the present invention. To simplify the following discussion, those elements of switch panel 30 that serve the same function as elements shown in FIG. 1 have been given the same numeric designations and will not be discussed further here. Switch panel 30 utilizes a back-illuminated projection screen 31 to create the image of the button pattern. An image is projected on projection screen 31 by a projector that includes an image generator 32 and a projection lens 33. The projected image is reflected onto projection screen 31 with the aid of a partially silvered mirror 34.

A wide variety of image generators can be utilized for image generator 32. For example, image generator 32 can be constructed from an LCD imaging panel that is controlled by controller 36. In this case, the LCD panel is preferably back lighted with a source that provides a different wavelength of light from that generated by light source 15. This configuration allows the button pattern to be easily changed. Furthermore, the button pattern can be changed in response to the previously pushed buttons to provide a menu-like system with sub-menus.

Image generator 32 can also be constructed from a light box that illuminates a fixed transparency. Such embodiments allow different button patterns to be implemented by changing the transparency. While such a configuration is less flexible than the embodiment utilizing an LCD or other programmable imaging panel, the transparency embodiment is less expensive.

In addition, an organic LED display that is counted directly on the backside of the touch plate can be utilized provided the display is transparent to light that is scattered when the user touches the screen. Flexible versions of such displays are also available. Flexible versions are particularly well adapted to curved touch plates of the type discussed below with reference to FIG. 4.

The above-described embodiments of the present invention utilize a rigid plate in which light is trapped by internal reflection. These embodiments rely on the interaction of the user's finger and the surface of the touch plate to interrupt the internal reflection of the light. These embodiments are less effective if the object pressed against the plate does not "wet" the surface of the touch plate. The need to wet the surface can be overcome by utilizing a touch plate that has a flexible surface. Refer now to FIG. 3, which is a cross-sectional view of a touch plate 40 that utilizes a flexible layer of transparent medium. Touch plate 40 includes a flexible transparent layer 41 that is bonded to a rigid plate 42. For the purposes of this discussion, it will be assumed that the index of refraction of the material from which layer 41 is constructed is sufficiently different from that of plate 42 that light entering the end of layer 41 as shown at 43 is trapped within the flexible layer. When a user presses on flexible layer 41 as shown at 44, surface 45 of flexible layer 41 is depressed and light is reflected from this depressed surface at an angle greater than the critical angle, and hence, escapes both layers 41 and 42.

It should be noted that layers 41 and 42 can also be made from materials with nearly the same index of refraction. In this case, the boundary 46 between the layers will not reflect light. Instead, the light will be trapped between surfaces 45 and 47. However, the light will still be reflected by the depression in surface 45 created by the user pressing on the surface, and hence, such embodiments will also function. Surface 45 can also be coated with a partially reflecting material to enhance the reflection of light at the point of depression.

The above-described embodiments utilize a touch plate that is flat. However, embodiments in which the touch plate is curved can also be constructed. Refer now to FIG. 4, which is a cross-sectional view of a portion of a switch panel 50 in which the touch plate is curved. Touch plate 51 is illuminated by a light source that inserts light in plate 51 at an angle that is sufficiently small to cause the light to be trapped between the top and bottom surfaces of touch plate 51. To simplify the drawing, the illumination source has been omitted.

This embodiment requires that the angle of curvature of touch plate 51 is sufficiently small that light so trapped will not strike the surface at an angle greater than the critical angle in the region of touch plate 51 that corresponds to "buttons" that the user can push. It should be noted, that the touch plate can have a varying radius of curvature that allows light to escape in the other "non-button" areas of the plate. Such an arrangement can be utilized to provide labels that are illuminated by the light within touch plate 51. The controller that processes the image can be programmed to ignore light that originates from regions of touch plate 51 that do not correspond to buttons.

Alternatively, the button pattern is displayed on a surface 52 in a manner analogous to that described above. Surface 52 can be a transparency having the button pattern printed thereon or a rear projection screen onto which the image of the buttons is projected.

The location at which the user touches the touch plate is recorded by camera 54. The surface of touch plate 51 is projected onto the camera by an optical imaging system shown as lens 53 in the drawing. The depth of field of the imaging system must be sufficient to accommodate the curvature of the touch plate surface.

The above-described embodiments of the present invention utilize wavelength separation for distinguishing the light scattered by the user touching the screen from other sources of light that may enter the camera. However, other methods for distinguishing the light that is scattered by the user pressing on the touch plate can also be utilized. Referring again to FIG. 1, light source 15 can be modulated at a predetermined rate by controller 16 by turning the light source on and off. Consider a difference image constructed by subtracting the image detected by photodetector array 14 when light source 15 is off, from the image detected when light source 15 is on. This image will show the point of contact on the touch plate even in the presence of other light sources without the need to separate the light from the touch plate using a color filter.

The embodiments of the present invention described above have utilized a separate projection screen or transparency for displaying the button pattern. However, embodiments in which the bottom surface of the touch plate provides this function can also be constructed. For example, a thin coating of a material that scatters light can be utilized to provide the projection screen function.

Some of the above-described embodiments of the present invention utilize a deformable layer as part of the touch plate. As used herein, a layer is said to be deformable if the surface is altered sufficiently to cause light trapped by internal reflection in that layer to be reflected such that the light strikes the opposite surface at an angle greater than the critical angle. The pressure needed to provide that deformation must be in the range that can be applied by a person touching the surface. For the purposes of this discussion, the desired deformation should be achieved with a pressure of less than one pound per square inch.

Various modifications to the present invention will become apparent to those skilled in the art from the foregoing description and accompanying drawings. Accordingly, the present invention is to be limited solely by the scope of the following claims.

What is claimed is:

1. A switch panel comprising:
    a touch plate comprising an optically transparent layer having first and second surfaces, said optically transparent layer having an index of refraction greater than that of air;
    an image generator that displays an image comprising a plurality of button positions to a person viewing said touch plate from said first surface,
    an imaging system that records an image of said first surface of said touch plate;
    a controller that is responsive to said image and generates an output signal if said touch plate is touched at one of said button positions; and
    a light source that generates a light signal that is reflected between said first and second surfaces of said touch plate within said transparent layer;
    wherein said first surface deforms sufficiently when a predetermined pressure is applied thereto to cause a portion of said light signal to be reflected toward said second surface at an angle greater than the critical angle in said optically transparent layer such that the reflected light escapes the optically transparent layer at the second surface.

2. The switch panel of claim 1 wherein a portion of said light signal is reflected toward said second surface at an angle greater than the critical angle in said optically transparent layer when said first surface is touched with a force greater than a predetermined force.

3. The switch panel of claim 1 wherein said optically transparent layer comprises a plastic.

4. The switch panel of claim 1 wherein said optically transparent layer comprises glass.

5. The switch panel of claim 1 wherein said optically transparent layer comprises a pressure deformable layer of optically transparent material bonded to a layer of non-deformable material.

6. The switch panel of claim 1 wherein said light signal comprises light of a probe wavelength and said image generator generates an image that is devoid of light of said probe wavelength.

7. The switch panel of claim 6 wherein said imaging system selectively images light of said probe wavelength.

8. The switch panel of claim 1 wherein said imaging system generates a difference image comprising the difference of first and second images, said first image being formed when said light signal is absent from said optically transparent layer and said second image being generated when said light signal is present in said optically transparent layer.

9. The switch panel of claim 1 wherein said image generator comprises a programmable display.

10. The switch panel of claim 1 wherein said image generator comprises a transparency.

11. A switch panel comprising:
    a touch plate comprising an optically transparent layer having first and second surfaces, said optically transparent layer having an index of refraction greater than that of air;
    an image generator that displays an image comprising a plurality of button positions to a person viewing said touch plate from said first surface,
    an imaging system that records an image of said first surface of said touch plate;
    a controller that is responsive to said image and generates an output signal if said touch plate is touched at one of said button positions; and a light source that generates a light signal that is reflected between said first and second surfaces of said touch plate within said transparent layer;
    wherein said imaging system generates a difference image comprising the difference of first and second images, said first image being formed when said light signal is absent from said optically transparent layer and said second image being generated when said light signal is present in said optically transparent layer.

* * * * *

UNITED STATES PATENT AND TRADEMARK OFFICE
CERTIFICATE OF CORRECTION

PATENT NO. : 7,310,090 B2  Page 1 of 1
APPLICATION NO. : 10/810157
DATED : December 18, 2007
INVENTOR(S) : Chi Mun Ho et al.

It is certified that error appears in the above-identified patent and that said Letters Patent is hereby corrected as shown below:

First Page, Column 1, (Inventors), Line 3, delete "Kean Loo Kah"
and insert -- Kean Loo Keh --;

First Page, Column 1, (Assignee), Line 1, delete "ECBM IP" and insert -- ECBU IP --.

Signed and Sealed this

Twenty-third Day of November, 2010

David J. Kappos
*Director of the United States Patent and Trademark Office*